(12) United States Patent
Peng et al.

(10) Patent No.: US 8,605,369 B2
(45) Date of Patent: Dec. 10, 2013

(54) PROJECTION LENS SYSTEM WITH HIGH RESOLUTION AND COMPACT SIZE

(75) Inventors: Fang-Ying Peng, New Taipei (TW); Xiao-Na Liu, Guangdong (CN); Hai-Jo Huang, New Taipei (TW); Sheng-An Wang, New Taipei (TW); An-Tze Lee, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 180 days.

(21) Appl. No.: 13/330,710

(22) Filed: Dec. 20, 2011

(65) Prior Publication Data
US 2013/0148213 A1    Jun. 13, 2013

(30) Foreign Application Priority Data
Dec. 7, 2011    (CN) .......................... 2011 1 0403292

(51) Int. Cl.
*G02B 13/18*    (2006.01)

(52) U.S. Cl.
USPC .......................................... 359/717; 359/708

(58) Field of Classification Search
USPC .......................................... 359/642, 708, 717
See application file for complete search history.

(56) References Cited

U.S. PATENT DOCUMENTS 5,831,773 A * 11/1998 Sato ............................. 359/691
2009/0109543 A1* 4/2009 Nagatoshi .................... 359/663

FOREIGN PATENT DOCUMENTS

CN    101135767 A    3/2008

* cited by examiner

*Primary Examiner* — James Greece
(74) *Attorney, Agent, or Firm* — Altis Law Group, Inc.

(57) ABSTRACT

A projection lens system includes, in order from the magnified side to the reduced side thereof, a first lens group with negative refractive power, and a second lens group with a positive refracting power. The first lens group includes a first lens having a negative refracting power. The projection lens system satisfies the following condition:

$$4.5 < |F1|/F < 6;$$

wherein F1 is the effective focal length of the first lens; F is the effective focal length of the projection lens system.

19 Claims, 9 Drawing Sheets

PROJECTION LENS SYSTEM WITH HIGH RESOLUTION AND COMPACT SIZE

BACKGROUND

1. Technical Field

The present disclosure relates to projection lenses and, particularly, to a projection lens system providing high resolution with reduced overall length.

2. Description of Related Art

In order to obtain a clear projected image and reduce the size of projectors, such as, digital light processing (DLP) projectors, liquid crystal display (LCD) projectors, and liquid crystal on silicon (LCoS) projectors, projection lens systems with high resolution and short overall length are needed. Factors affecting both the resolution and the overall length of the projection lens system, such as the number and position of lenses employed, the refractive power distributions of the employed lenses, and the shapes of the employed lenses, are complicated. For example, reducing the number of lenses can shorten the overall length of the projection lens system, but the resolution of the projection lens system will suffer; conversely, increasing the number of lenses of the projection lens system can increase the resolution of the projection lens system, but the overall length of the projection lens system is increased.

What is needed, therefore, is a projection lens system which can overcome or at least alleviate the above problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail below, with reference to the accompanying drawings.

Figure 1:
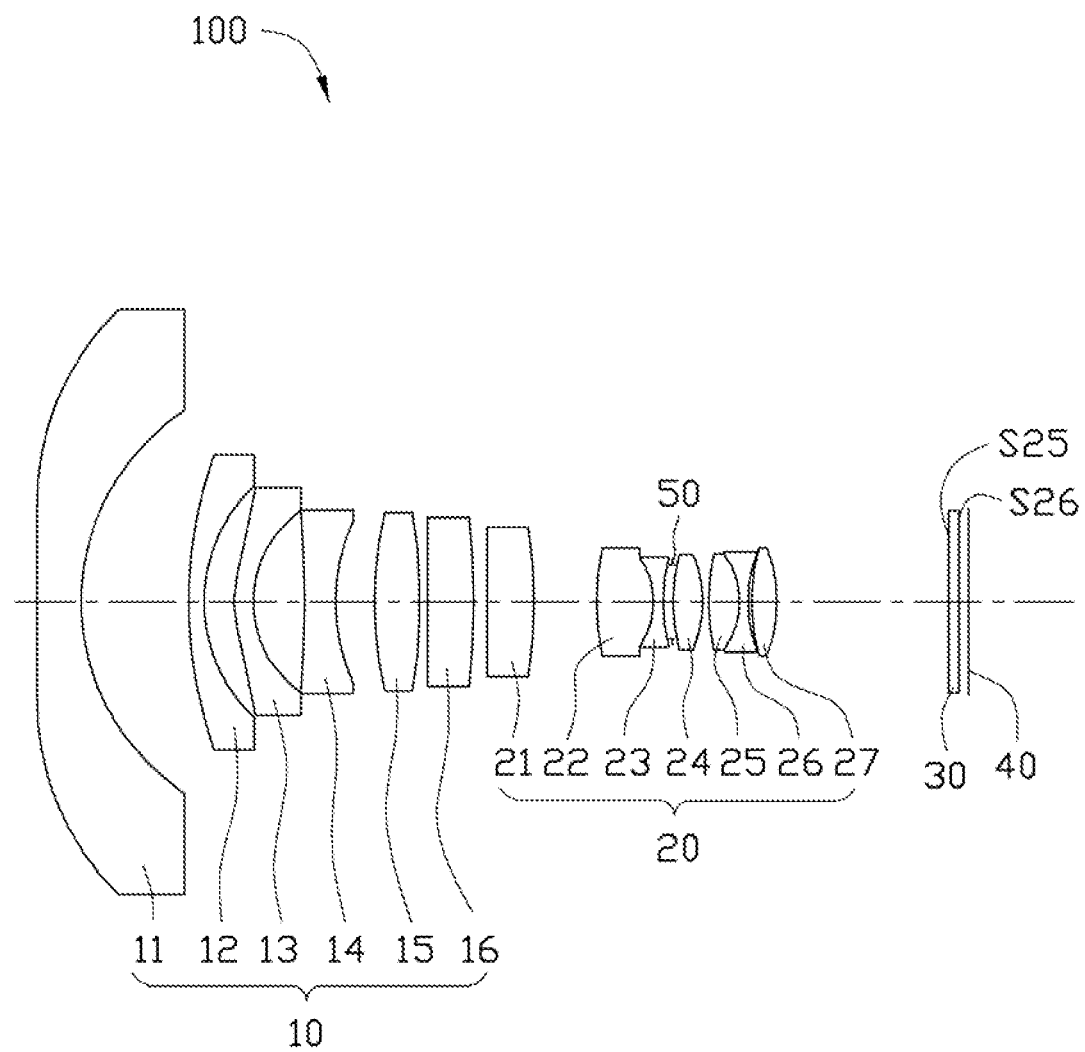
FIG. 1 is a schematic view of a projection lens system which includes a first lens group and a second lens group, in accordance with the present disclosure.
Figure 2:
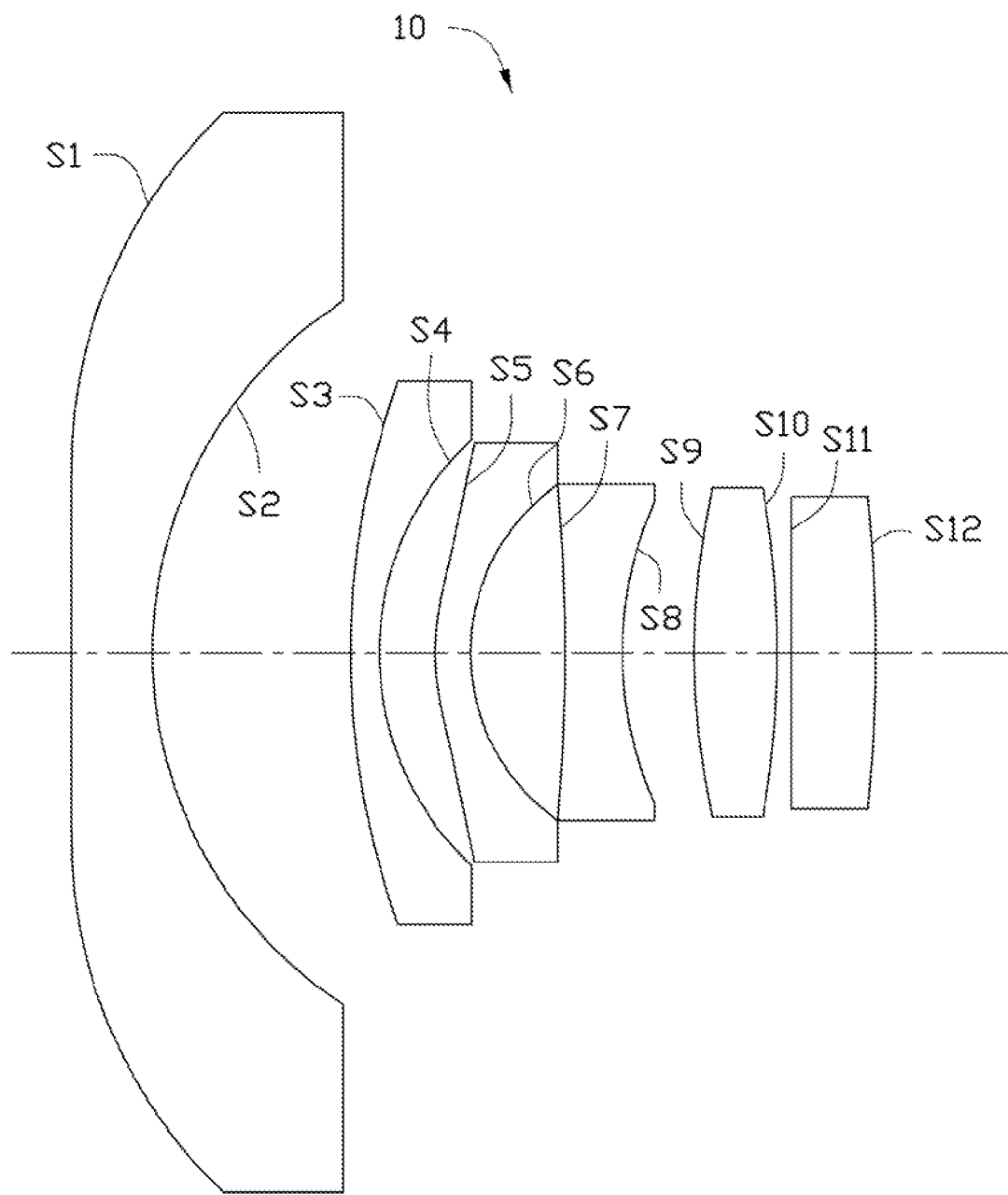
FIG. 2 is a schematic view of the first lens group of FIG. 1.
Figure 3:
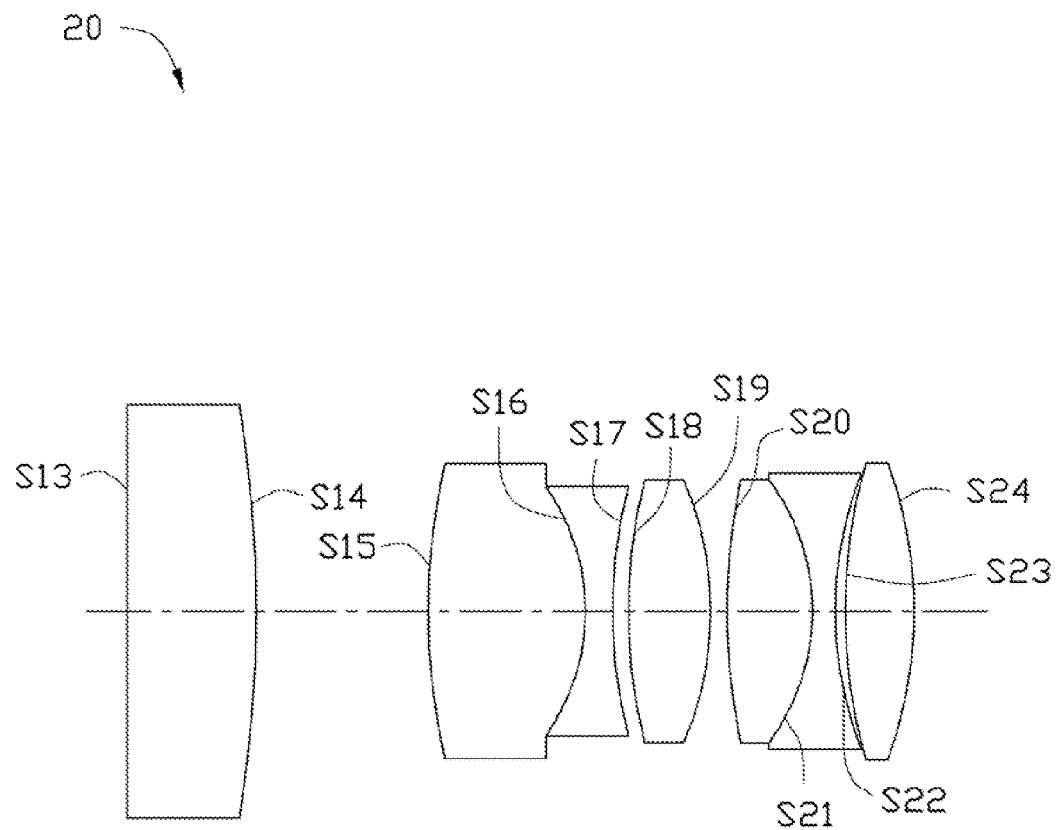
FIG. 3 is a schematic view of the second lens group of FIG. 1.

Referring to FIGS. 1-3, a projection lens system 100 according to the present disclosure is described. The projection lens system 100 with positive refracting power includes, in order from the magnified side to the reduced side of the projection lens system 100, a first lens group 10, a second lens group 20, a cover glass 30. The first lens group 10 in negative refracting power and the second lens group 20 in positive refracting power are configured to project a wide-angle and large image in a limited space.

In the embodiment, the projection lens system 100 is utilized in a digital light processing (DLP) projector. A spatial light modulator (SLM) 40, for example, a digital micro-mirror device (DMD), modulates light signals for projection through the projection lens system 100. The light signals are transmitted through the cover glass 30, the second lens group 20, and the first lens group 10 in sequence, and then projected onto a surface (not shown) to display images.

The first lens group 10 includes, in order from the magnified side to the reduced side of the projection lens system 100, a first lens 11 having a negative refracting power, a second lens 12 having a negative refracting power, a third lens 13 having a negative refracting power, a fourth lens 14 having a negative refracting power, a fifth lens 15 having a positive refracting power, and a sixth lens 16 having a positive refracting power.

In order from the magnified side to the reduced side of the projection lens system 100. The first lens 11 includes a first surface S1 and a second surface S2, The second lens 12 includes a third surface S3 and a fourth surface S4. The third lens 13 includes a fifth surface S5 and a sixth surface S6. The fourth lens 14 includes a seventh surface S7 and an eighth surface S8. The fifth lens 15 includes a ninth surface S9 and a tenth surface S10. The sixth lens 16 includes an eleventh surface S11 and a twelfth surface S12. In the embodiment, the first surface S1, the second surface S2, the fifth surface S5, and the sixth surface S6 are all spherical surfaces. The third surface S3, the fourth surface S4, the seventh surface S7, the eighth surface S8, the ninth surface S9, the tenth surface S10, the eleventh surface S11, and the twelfth surface S12 are all aspherical surfaces.

The second lens group 20 includes, in order from the magnified side to the reduced side of the projection lens system 100, a seventh lens 21 having a positive refracting power, an eighth lens 22 having a positive refracting power, a ninth lens 23 having a negative refracting power, a tenth lens 24 having a positive refracting power, an eleventh lens 25 having a negative refracting power, a twelfth lens 26 having a positive refracting power, and a thirteenth lens 27 having a positive refracting power.

The eighth lens 22 and the ninth lens 23 are attached together to form a single unit. The eleventh lens 25 and the twelfth lens 26 are also attached together to form a single unit.

In order from the magnified side to the reduced side of the projection lens system 100. The seventh lens 21 includes a thirteenth surface S13, and the fourteenth surface S14. The eighth lens 22 includes a fifteenth surface S15 and a sixteenth surface S16. The ninth lens 23 includes the sixteenth surface S16 and a seventeenth surface S17. The tenth lens 24 includes an eighteenth surface S18 and a nineteenth surface 19. The eleventh lens 25 includes a twentieth surface S20 and a twenty-first surface S21. The twelfth lens 26 includes the twenty-first surface S21 and a twenty-second surface S22. The thirteenth lens 27 includes a twenty-third surface S23 and a twenty-fourth surface S24. In the embodiment, the thirteenth surface S13, the fourteenth surface S14 fifteenth surface S15, the sixteenth surface S16, the seventeenth surface S17, the eighteenth surface S18, the nineteenth surface 19, the twentieth surface S20, the twenty-first surface S21, the twenty-second S22, the twenty-third surface S23, and the twenty-fourth surface S24 are all spherical surfaces.

The aperture stop 50 is installed between the ninth lens 23 and the tenth lens 24. The aperture stop 50 adjusts the light flux from the tenth lens 24 to the ninth lens 23. In addition, the aperture stop 50 facilitates a uniform light transmission when light passes through the tenth lens 24, to correct chromatic aberrations of the lens system 100. To minimize the cost of manufacture and to reduce the total length of the lens system 100, the aperture stop 50 can be a film of opaque material adhesively positioned on the periphery of the eighteenth surface S18 of the tenth lens 24.

To minimize the cost of manufacturing, both the first lens 11 and the third lens 13 are made of resin, the other lens are all made of glass.

The cover glass 30 includes, in order from the magnified side to the reduced side of the projection lens system 100, a twenty-fifth surface S25 and a twenty-sixth surface S26. The cover glass 30 adjusts the light path and protects a magnified-side surface of the SLM 40.

In order to obtain low distortion, good imaging quality and a compact configuration, the projection lens system 100 satisfies the following condition:

$$4.5 < |F1|/F < 6; \quad (1)$$

wherein F1 is the effective focal length of the first lens 11; F is the effective focal length of the projection lens system 100.

Condition (1) can favorably limit the relationship between the focal length of every lens group and the focal length of the projection lens system 100 to obtain a high resolution.

In the embodiment, the projection lens system 100 further satisfies the following condition:

$$0.02 < 1/|F1| + 1/|F3| < 0.06; \quad (2)$$

wherein, F3 is the effective focal length of the third lens 13.

Condition (2) is for maintaining quality of images projected by the projection lens system 100. If the projection lens system 100 does not satisfy the conduction (2), the images projected by the projection lens system 100 cannot be corrected.

The above aspherical surfaces are shaped according to the formula:

$$Z = \frac{ch^2}{1 + \sqrt{1-(k+1)c^2h^2}} + \sum A_i h^i$$

wherein Z is the length of a line drawn from a point on the aspherical surface to the tangential plane of the aspherical surface in a direction parallel to an optical axis of the projection lens system 100, h is the height from the optical axis to the point on the aspherical surface, c is a vertex curvature (=1/R, the radius of curvature), k is a conic constant, and Ai are the correction coefficients, to the order of "i" of the aspherical surface.

The following symbols are used.

$F_{No}$: F number;
$2\omega$: field angle;
ri: radius of curvature of the surface Si;
Di: distance between surfaces on the optical axis of the surface Si and the surface Si+1;
Ni: refractive index of the surface Si;
Vi: Abbe constant of the surface Si;
F: effective focal length of the projection lens system 100;
F1: focal length of the first lens group 11;
F2: focal length of the second lens 12; and
F3: focal length of the third lens 13.

EXAMPLE 1

Tables 1-3 show a specification of a first exemplary embodiment of the projection lens system 100.

TABLE 1

| Surface | Type | ri(mm) | Di(mm) | Ni | Vi |
|---|---|---|---|---|---|
| S1 | aspherical | −119.5143 | 5.126748 | 1.525279 | 55.950760 |
| S2 | aspherical | 23.87856 | 12.73868 | — | — |
| S3 | spherical | 50.26009 | 1.864574 | 1.744001 | 44.899072 |
| S4 | spherical | 19.31296 | 3.596751 | — | — |
| S5 | aspherical | 16.38402 | 2.306044 | 1.531131 | 55.753858 |
| S6 | aspherical | 10.06345 | 6.10837 | — | — |
| S7 | spherical | −298.061 | 3.792252 | 1.772487 | 49.590644 |
| S8 | spherical | 25.49962 | 4.537637 | — | — |
| S9 | spherical | 44.00633 | 5.525943 | 1.728250 | 28.315013 |
| S10 | spherical | −54.79348 | 0.8464487 | — | — |
| S11 | spherical | −439.6833 | 5.326233 | 1.516798 | 64.198266 |
| S12 | spherical | −84.18804 | 1.772943 | — | — |
| S13 | spherical | −582.5401 | 5.573058 | 1.487489 | 70.441128 |
| S14 | spherical | −47.16525 | 7.384164 | — | — |
| S15 | spherical | 26.76838 | 6.738165 | 1.625886 | 35.713790 |
| S16 | spherical | −9.901512 | 1.317118 | 1.834000 | 37.345047 |
| S17 | spherical | 19.78821 | 0.4918053 | — | — |
| S18 | STOP | 15.61624 | 3.737973 | 1.517420 | 52.150780 |
| S19 | spherical | −13.49637 | 0.6368761 | — | — |
| S20 | spherical | 28.79612 | 3.746964 | 1.496997 | 81.608364 |
| S21 | spherical | −9.470331 | 0.8224026 | 1.701542 | 41.148948 |
| S22 | spherical | 15.24539 | 0.4093521 | — | — |
| S23 | spherical | 18.64409 | 3.171194 | 1.487489 | 70.441128 |
| S24 | spherical | −17.80329 | 21.09532 | — | — |
| S25 | spherical | infinite | 1.05 | 1.516798 | 64.198266 |
| S26 | spherical | infinite | 1.1 | — | — |
| IMA | standard | infinite | — | — | — |

TABLE 2

| aspherical coefficient | first surface S1 | second surface S2 | fifth surface S5 | sixth surface S6 |
|---|---|---|---|---|
| A4 | 2.1654049e−005 | −2.4879703e−005 | −0.00018895388 | −9.3106332e−005 |
| A6 | −1.7123811e−008 | 1.3178559e−007 | 3.8202434e−007 | −4.5099436e−007 |
| A8 | 6.8269893e−012 | −7.1056829e−011 | −1.782508e−009 | 4.6854112e−009 |
| A10 | −5.6946563e−015 | −8.0353617e−013 | 5.2767848e−012 | −8.6371934e−013 |
| A12 | 1.471007e−017 | 9.1321857e−016 | 5.6308458e−015 | 1.8972789e−014 |
| A14 | −1.5087722e−020 | 7.7608282e−019 | 1.4484761e−017 | 5.2651015e−016 |
| A16 | 5.3163673e−024 | −1.2353027e−021 | −3.4293024e−019 | −3.8960328e−018 |

TABLE 3

| F(mm) | $F_{No}$ | F1 (mm) | F3 (mm) | |F1|/F | |F1| + 1/|F3| |
|---|---|---|---|---|---|
| 7.01 | 2.6 | −37.28 | −56.03 | 5.3 | 0.045 |

Figure 4:
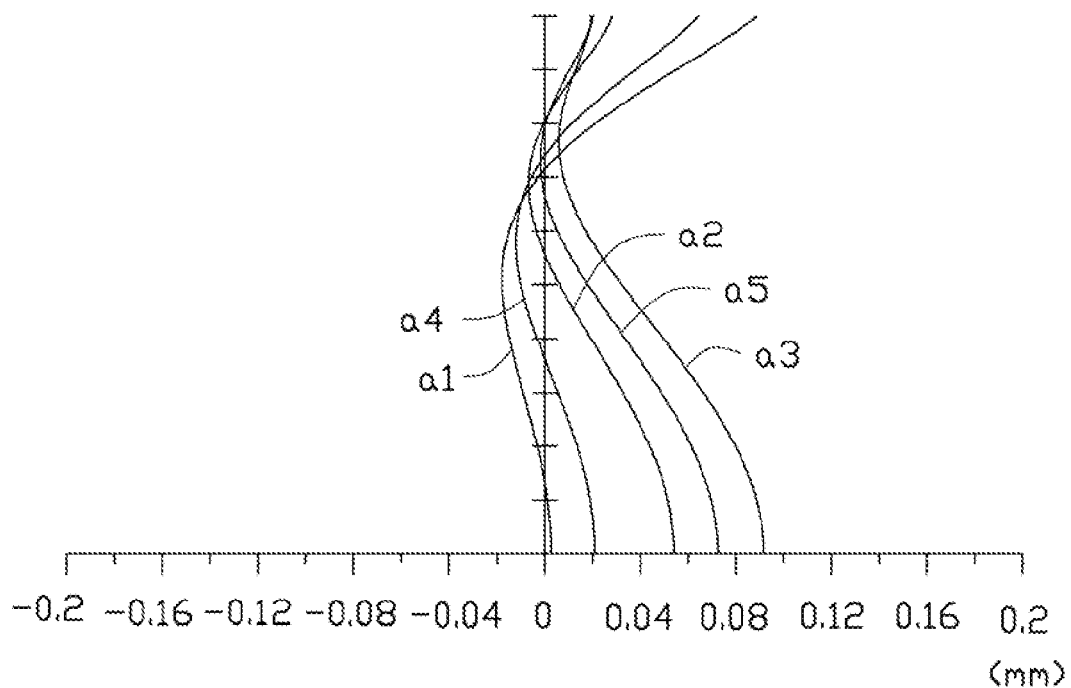
FIG. 4 is a diagram showing the spherical aberration of the projection lens system of FIG. 1 in accordance with the first embodiment.
Figure 5:
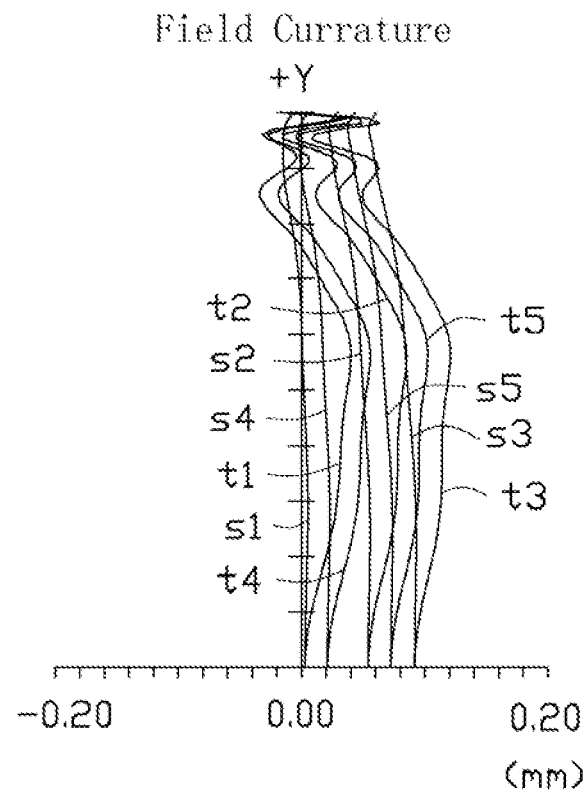
FIG. 5 is a diagram showing the field curvature of the projection lens system of FIG. 1 in accordance with the first embodiment.
Figure 6:
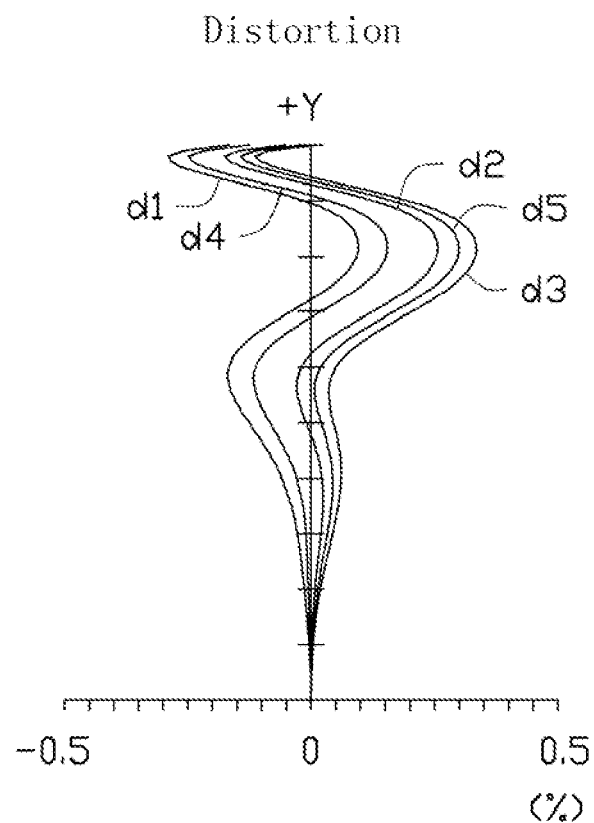
FIG. 6 is a diagram showing distortion values of the projection lens system of FIG. 1 in accordance with the first embodiment.

FIGS. 4-6, are graphs of particular aberrations (spherical aberration, field curvature, distortion, and lateral chromatic aberration) of the first exemplary embodiment of the projection lens system 100. In FIG. 4, the curves represent the spherical aberration characteristics of a1 light (wavelength: 450 nm), a2 light (wavelength: 550 nm), a3 light (wavelength: 630 nm), a4 light (wavelength: 480 nm), and a5 light (wavelength: 590 nm) of the projection lens system 100. The spherical aberration of the lens system 100 is from −0.2 mm to 0.2 mm. As illustrated in FIG. 5, the curves t1~t5 and s1~s5 are respectively the tangential field curvature curve and the sagittal field curvature curve. The field curvature of the lens system 100 is from −0.2 mm to 0.2 mm. In FIG. 6, the distortion of the lens system 100 is from −0.5% to 0.5%.

EXAMPLE 2

Tables 4-6 show a specification of a second exemplary embodiment of the projection lens system 100.

TABLE 4

| Surface | Type | ri(mm) | Di(mm) | Ni | Vi |
|---|---|---|---|---|---|
| S1 | aspherical | −142.1265 | 4.090293 | 1.525279 | 55.950760 |
| S2 | aspherical | 23.42297 | 13.3142 | — | — |
| S3 | spherical | 67.07086 | 2.36738 | 1.815999 | 46.571898 |
| S4 | spherical | 14.32691 | 4.136782 | — | — |
| S5 | aspherical | 18.17428 | 1.944964 | 1.531131 | 55.753858 |
| S6 | aspherical | 13.3652 | 4.843956 | — | — |
| S7 | spherical | −96.07466 | 2.266589 | 1.804200 | 46.502537 |
| S8 | spherical | 26.57234 | 1.920898 | — | — |
| S9 | spherical | 49.23711 | 7.097836 | 1.805181 | 25.456421 |
| S10 | spherical | −95.31072 | 0.8063903 | — | — |
| S11 | spherical | 68.61087 | 5.11252 | 1.548100 | 45.886233 |
| S12 | spherical | −45.46443 | 5.149678 | — | — |
| S13 | spherical | 281.2653 | 7.417814 | 1.531719 | 48.755584 |
| S14 | spherical | −27.38266 | 8.920428 | — | — |
| S15 | spherical | 31.84056 | 3.31622 | 1.532561 | 45.942878 |
| S16 | spherical | −10.10198 | 1.800874 | 1.834000 | 37.345047 |
| S17 | spherical | 21.54554 | 0.7624864 | — | — |
| S18 | STOP | 14.96408 | 2.890841 | 1.517419 | 52.189002 |
| S19 | spherical | −12.90413 | 0.256056 | — | — |
| S20 | spherical | 32.80563 | 2.982972 | 1.531722 | 48.854767 |
| S21 | spherical | −8.423573 | 0.8866409 | 1.701542 | 41.148948 |
| S22 | spherical | 14.73699 | 0.8969876 | — | — |
| S23 | spherical | 23.49188 | 3.856434 | 1.487489 | 70.441128 |
| S24 | spherical | −16.13902 | 21.21881 | — | — |
| S25 | spherical | infinite | 1.05 | 1.516798 | 64.198266 |
| S26 | spherical | infinite | 1.1 | — | — |
| IMA | standard | infinite | — | — | — |

TABLE 2

| aspherical coefficient | first surface S1 | second surface S2 | fifth surface S5 | sixth surface S6 |
|---|---|---|---|---|
| A4 | 2.5289199e−005 | −2.072531e−005 | −0.00019648251 | −0.00011192903 |
| A6 | −2.2743114e−008 | 1.034622e−007 | 4.326279e−007 | −1.7162945e−007 |
| A8 | 9.6480706e−012 | −6.4665438e−012 | −1.1243956e−009 | 4.4433463e−009 |
| A10 | −5.985568e−016 | −8.9628585e−013 | 5.0452097e−012 | 1.4977246e−011 |
| A12 | 1.1031934e−017 | 7.167733e−016 | 2.2552433e−014 | −7.9667271e−014 |
| A14 | −2.153744e−020 | 1.5764003e−018 | −4.8455088e−017 | −4.8827854e−016 |
| A16 | 1.1265646e−023 | −1.8233269e−021 | −1.0694673e−018 | 9.6113294e−020 |

TABLE 3

| F(mm) | $F_{No}$ | F1 (mm) | F3 (mm) | |F1|/F | |F1| + 1/|F3| |
|---|---|---|---|---|---|
| 6.98 | 2.68 | −37.8 | −56.03 | 5.42 | 0.035 |

Figure 7:
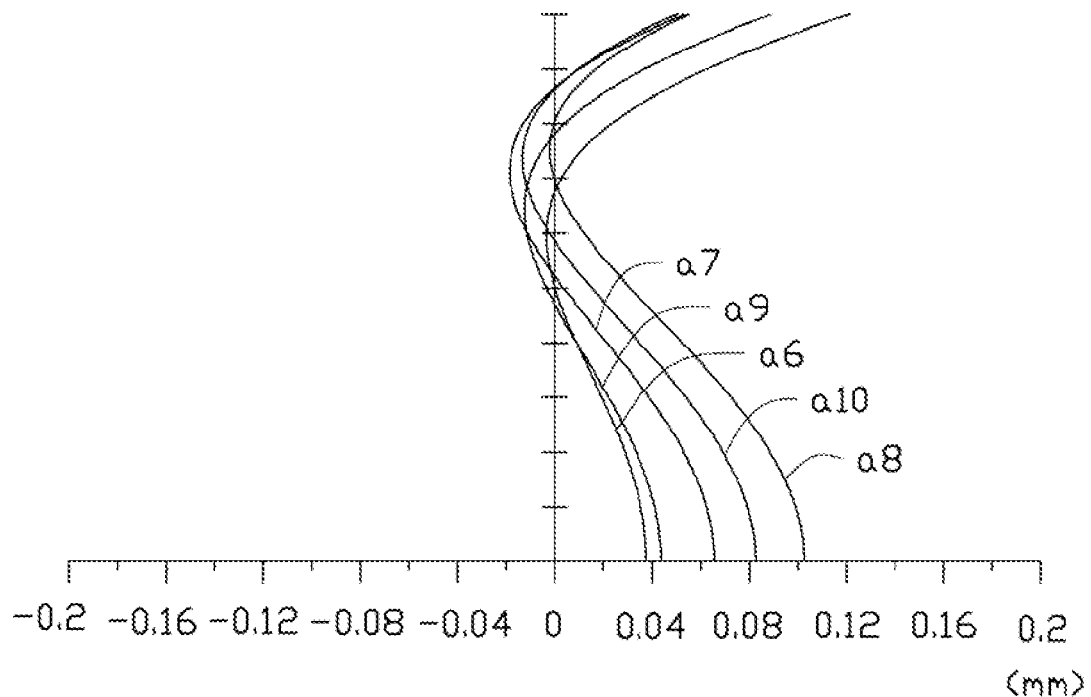
FIG. 7 is a diagram showing the spherical aberration of the projection lens system of FIG. 1 in accordance with the second embodiment.
Figure 8:
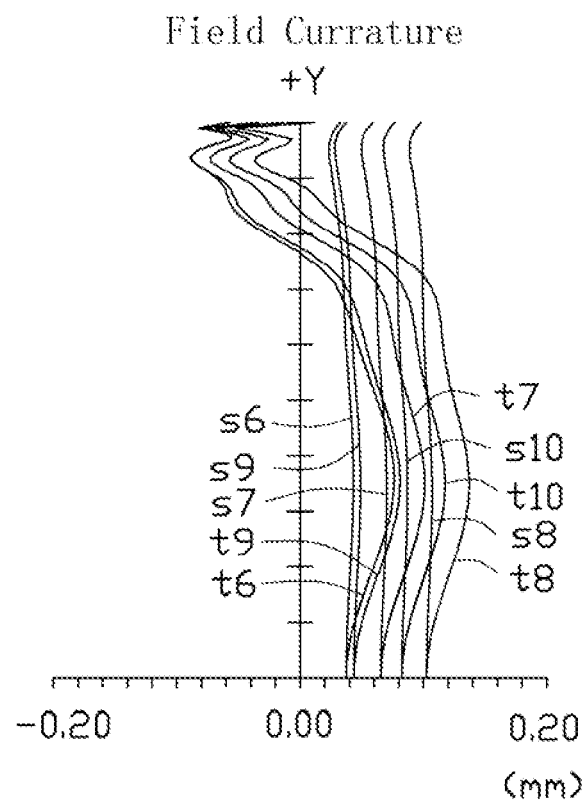
FIG. 8 is a diagram showing the field curvature of the projection lens system of FIG. 1 in accordance with the second embodiment.
Figure 9:
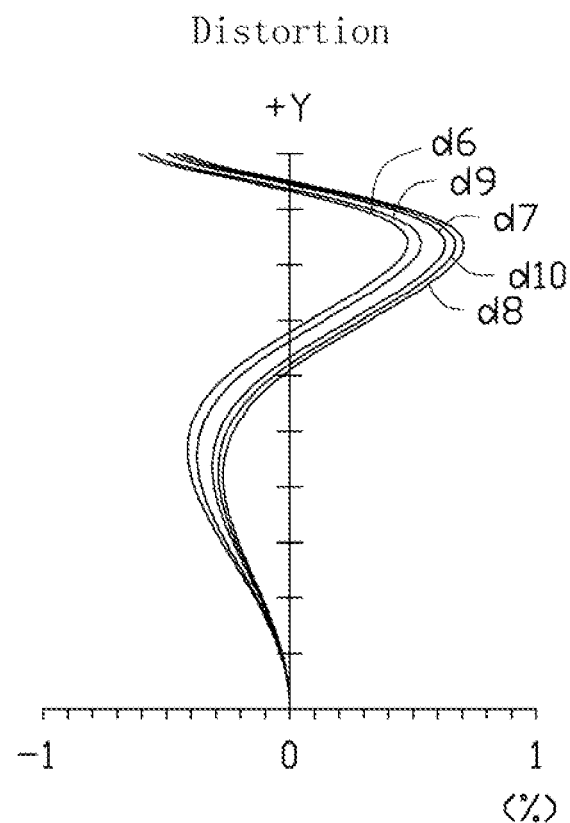
FIG. 9 is a diagram showing distortion values of the projection lens system of FIG. 1 in accordance with the second embodiment.

FIGS. 7-9, are graphs of particular aberrations (spherical aberration, field curvature, distortion, and lateral chromatic aberration) of the second exemplary embodiment of the projection lens system 100. In FIG. 7, the curves represent the spherical aberration characteristics of a6 light (wavelength: 450 nm), a7 light (wavelength: 550 nm), a8 light (wavelength: 630 nm), a9 light (wavelength: 480 nm), and a10 light (wavelength: 590 nm) of the projection lens system 100. The spherical aberration of the lens system 100 is from −0.2 mm to 0.2 mm. As illustrated in FIG. 8, the curves t5~t10 and s6~s10 are respectively the tangential field curvature curve and the sagittal field curvature curve. The field curvature of the lens system 100 is from −0.2 mm to 0.2 mm. In FIG. 9, the distortion of the lens system 100 is from −1% to 1%.

In the embodiment, although the overall length of the projection lens system 100 is very much reduced, any aberration inherent in the projection lens system 100 is maintained within an acceptable range. That is, the projection lens system 100 keeps chromatic aberrations at a minimum whilst reducing the total length of the projection lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A projection lens system, in the order from the magnified side to the reduced side thereof, comprising:
    a first lens group with a negative refracting power, in the order from the magnified side to the reduced side of the projection lens system, the first lens group comprising a first lens having a negative refracting power, a second lens having a negative refracting power, a third lens having a negative refracting power, a fourth lens having a negative refracting power, a fifth lens having a positive refracting power, and, a sixth lens having a positive refracting power;
    a second lens group with a positive refracting power; and
    wherein the projection lens system satisfies the following condition:

$$4.5 < |F1|/F < 6;$$

where F1 is the effective focal length of the first lens; F is the effective focal length of the projection lens system.

2. The projection lens system of claim 1, wherein the projection lens system further satisfies the condition:

$$0.02<1/|F1|+1/|F3|<0.06;$$

where, F3 is the effective focal length of the third lens.

3. The projection lens system of claim 1, wherein both the first lens and the third lens are made of resin.

4. The projection lens system of claim 1, wherein both the first lens and the third lens are asperical lenses.

5. The projection lens system of claim 1, wherein the second lens, the fourth lens, the fifth lens, and the sixth lens are spherical lenses.

6. The projection lens system of claim 1, wherein the second lens group comprises, in the order from the magnified side to the reduced side of the projection lens system, a seventh lens having a positive refracting power, an eighth lens having a positive refracting power, a ninth lens having a negative refracting power, a tenth lens having a positive refracting power, an eleventh lens having a negative refracting power, a twelfth lens having a positive refracting power, and a thirteenth lens having a positive refracting power.

7. The projection lens system of claim 6, wherein the eighth lens and the ninth lens are attached together to form a single unit, the eleventh lens and the twelfth lens are attached together to form a single unit.

8. The projection lens system of claim 6, wherein the seventh lens, the eighth lens, the ninth lens, the tenth lens, the eleventh lens, and the twelfth lens are spherical lenses.

9. The projection lens system of claim 6, further comprising an aperture stop, wherein the aperture stop is installed between the ninth lens and the tenth lens.

10. The projection lens system of claim 9, wherein the aperture stop is a film made of opaque material and positioned on a periphery of a surface of the tenth lens closing to the ninth lens.

11. A projection lens system, in the order from the magnified side to the reduced side thereof, comprising:
a first lens group with a negative refracting power, in the order from the magnified side to the reduced side of the projection lens system, the first lens group comprising a first lens, a second lens and a third lens;
a second lens group with a positive refracting power; and
wherein the projection lens system satisfies the following conditions:

$$4.5<|F1|/F<6;$$

$$0.02<1/|F1|+1/|F3|<0.06;$$

where F1 is the effective focal length of the first lens; F is the effective focal length of the projection lens system, F3 is the effective focal length of the third lens.

12. The projection lens system of claim 11, wherein in the order from the magnified side to the reduced side of the projection lens system, the first lens group comprises the first lens having a negative refracting power, the second lens having a negative refracting power, the third lens has a negative refracting power, a fourth lens having a negative refracting power, a fifth lens having a positive refracting power, and a sixth lens having a positive refracting power.

13. The projection lens system of claim 11, wherein both the first lens and the third lens are asperical lenses.

14. The projection lens system of claim 12, wherein the second lens, the fourth lens, the fifth lens, and the sixth lens are spherical lenses.

15. The projection lens system of claim 11, wherein the second lens group comprises, in the order from the magnified side to the reduced side of the projection lens system, a seventh lens having a positive refracting power, an eighth lens having a positive refracting power, a ninth lens having a negative refracting power, a tenth lens having a positive refracting power, an eleventh lens having a negative refracting power, a twelfth lens having a positive refracting power, and a thirteenth lens having a positive refracting power.

16. The projection lens system of claim 15, wherein the eighth lens and the ninth lens are attached together to form a single unit, the eleventh lens and the twelfth lens are attached together to form a single unit.

17. The projection lens system of claim 15, wherein the seventh lens, the eighth lens, the ninth lens, the tenth lens, the eleventh lens, and the twelfth lens are spherical lenses.

18. The projection lens system of claim 15, further comprising an aperture stop, wherein the aperture stop is installed between the ninth lens and the tenth lens.

19. The projection lens system of claim 18, wherein the aperture stop is a film made of opaque material and positioned on a periphery of a surface of the tenth lens closing to the ninth lens.

* * * * *